United States Patent

[11] 3,633,763

| [72] | Inventor | William H. Peterson<br>Homewood, Ill. |
|---|---|---|
| [21] | Appl. No. | 889,439 |
| [22] | Filed | Dec. 31, 1969 |
| [45] | Patented | Jan. 11, 1972 |
| [73] | Assignee | Pullman Incorporated<br>Chicago, Ill. |

[54] PRESSURE RELIEF MEANS FOR A HYDRAULIC CUSHION
4 Claims, 4 Drawing Figs.

[52] U.S. Cl. .................................................. 213/43, 267/64
[51] Int. Cl. .................................................. B61g 9/08
[50] Field of Search ........................................ 213/8, 43, 223; 188/320; 267/64, 65

[56] References Cited
UNITED STATES PATENTS

| 3,341,189 | 9/1967 | Rumsey | 213/43 |
| 3,525,449 | 8/1970 | Zanow | 213/43 |
| 3,154,177 | 10/1964 | Szostak | 188/320 |
| 3,199,638 | 8/1965 | Otomo | 188/320 |
| 3,446,317 | 5/1969 | Gryglas | 188/320 |

*Primary Examiner*—Drayton E. Hoffman
*Attorneys*—Hilmond O. Vogel and Wayne Morris Russell ABSTRACT: A pressure relief valve arrangement for use in a double-acting hydraulic piston and cylinder cushioning device which prevents buff and draft impacts from damaging lading in a railway car. The pressure relief valve is located in a radial bore in the movable piston head which connects passages communicating with the high- and low-pressure areas and comprises a cylindrical valve spool biased by a compression spring. The spring maintains the valve spool in a closed position against the end of the passage to the low-pressure fluid thus cutting off fluid flow between the high- and low-pressure areas. When a predetermined pressure is reached in a low-pressure cylinder, indicating an excessively high pressure in the high-pressure chamber, the relief valve will open the passages connecting the high- and low-pressure areas thus providing relief for the high-pressure fluid.

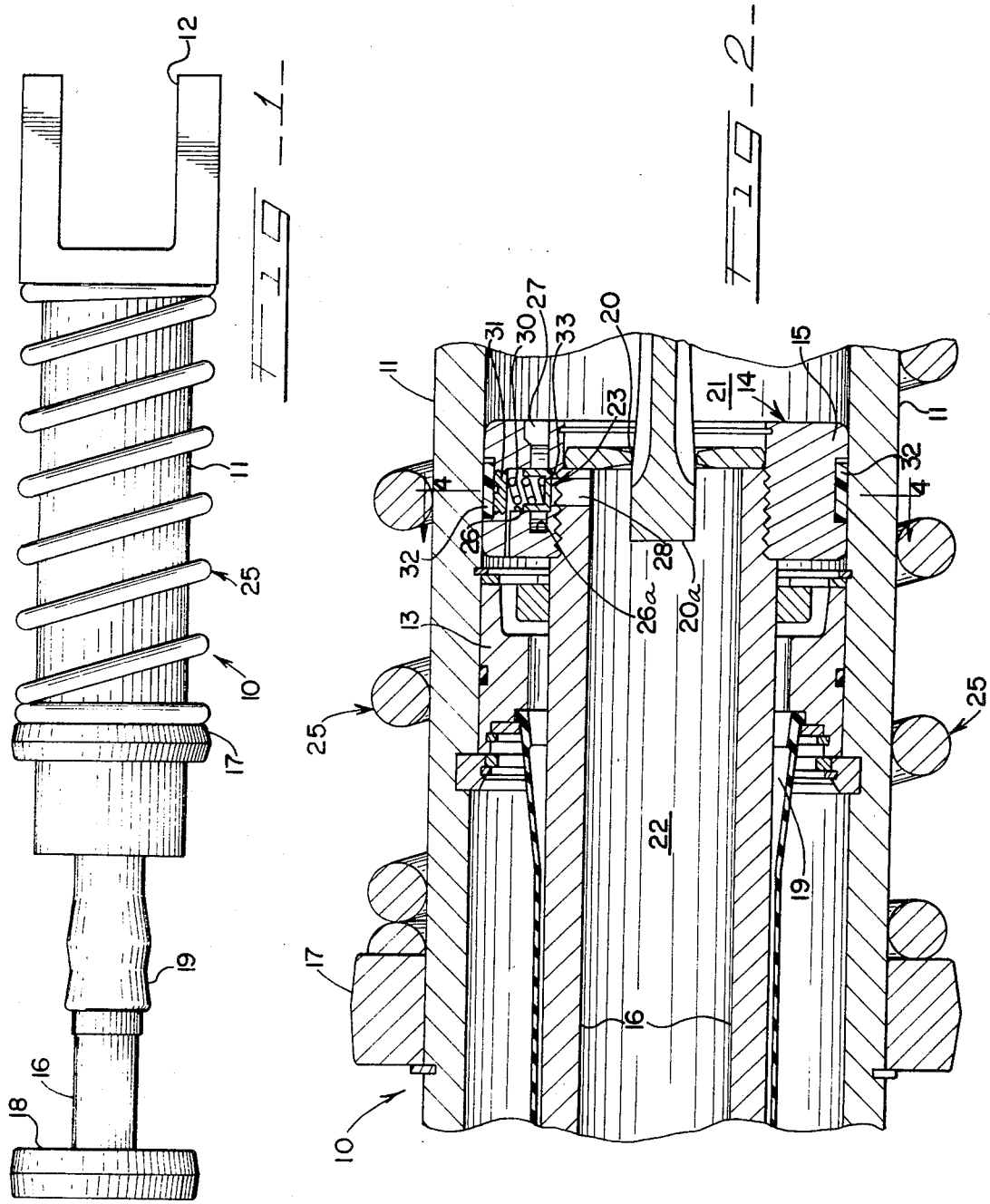

INVENTOR
WILLIAM H. PETERSON
BY Wayne Morris Russell
ATT'Y.

PRESSURE RELIEF MEANS FOR A HYDRAULIC CUSHION

SUMMARY

Present invention relates to a double-acting hydraulic cushion device used at the ends of railway cars to absorb impact imposed on the couplers and thereby reduce damage to the lading and to the railway car. These end-of-car cushions as they are called ate so constructed as to be able to absorb impact in both buff and draft. It is particularly important in cushions of this nature to provide a pressure relief means whereby the excessive pressures caused by high-speed impacts will not rupture the hydraulic cushions. The primary object of the invention is to provide an improved pressure relief means to prevent rupture in a hydraulic cushion device having an outer cylinder with an enclosed end and a piston rod with a pistonhead assembly moving longitudinally therein. The cylinder is movable in buff and moves relative to the piston displacing fluid from the cylinder through an orifice in the pistonhead and into a second, low-pressure, chamber. Upon impact in the draft direction the reverse occurs thus producing a double-acting hydraulic cushion device. Since buff impacts sometimes occur at excessive speeds resulting in pressures which exceed the design limits of the unit, an improved pressure relief valve is necessitated. It is, therefore, a further object of this invention to provide for a hydraulic cushion unit having a pressure relief valve mounted radially of the cylinder in the pistonhead so as to be insulated from impacting forces during car travel. Since it moves, during operation, on an axis which is at a right angle to the axis on which the piston moves, sudden accelerations of the piston during impact do not effect the pressure relief valve and its movement depends only upon pressure, as intended. It is still another object of this invention to provide a pressure relief valve having a valve member sensing pressure on the low side of the pistonhead and because pressure on the low side of the pistonhead is proportional to the pressure on the high-pressure side or face of the pistonhead the relief valve thereby indirectly sensing undesirable higher pressures which could rupture the high pressure cylinder and in doing so the valve opens passages connecting the high- and low-pressure cylinders allowing high-pressure fluid to escape before the high pressure cylinder is damaged. By utilizing the low side of the piston for sensing these high pressures the relief valve requires a much smaller bias spring and can be located in the small available space.

BRIEF DESCRIPTION OF THE DRAWINGS

FIG. 1 is a plan view of a cushioning device;

FIG. 2 is a fragmentary view of a cross section of the device shown in FIG. 1 in an expanded position;

DETAILED DESCRIPTION

Figure 3:
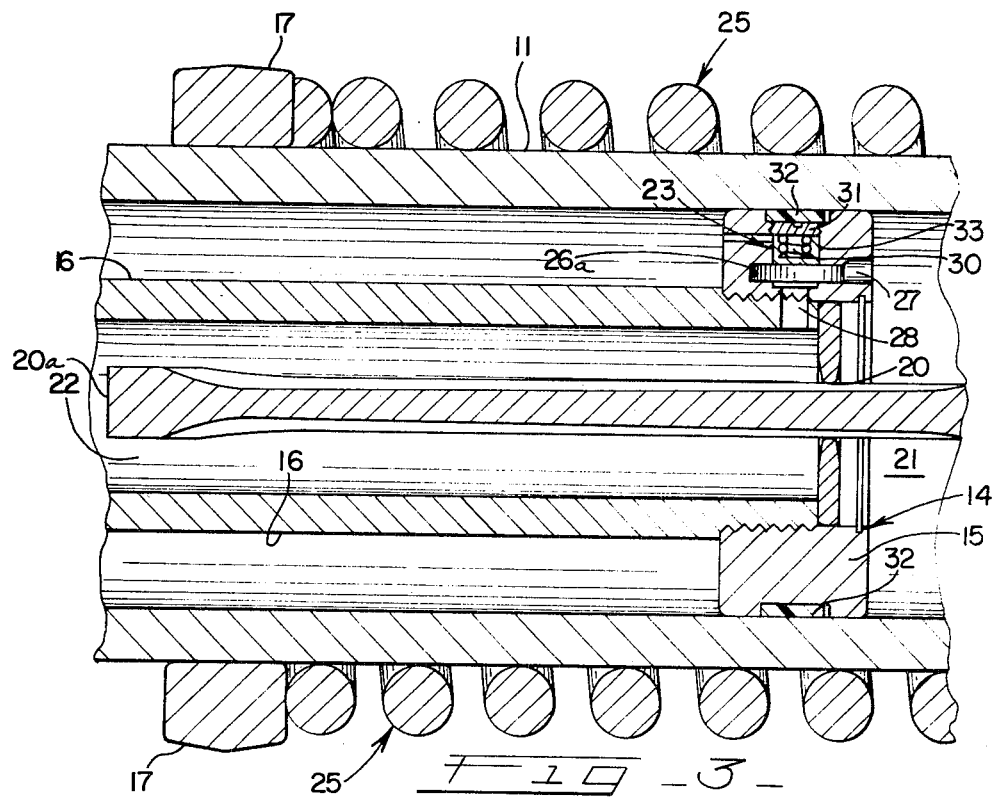
FIG. 3 is a fragmentary view of a cross section of the device shown in FIG. 1 shown in the contracted position.
Figure 4:
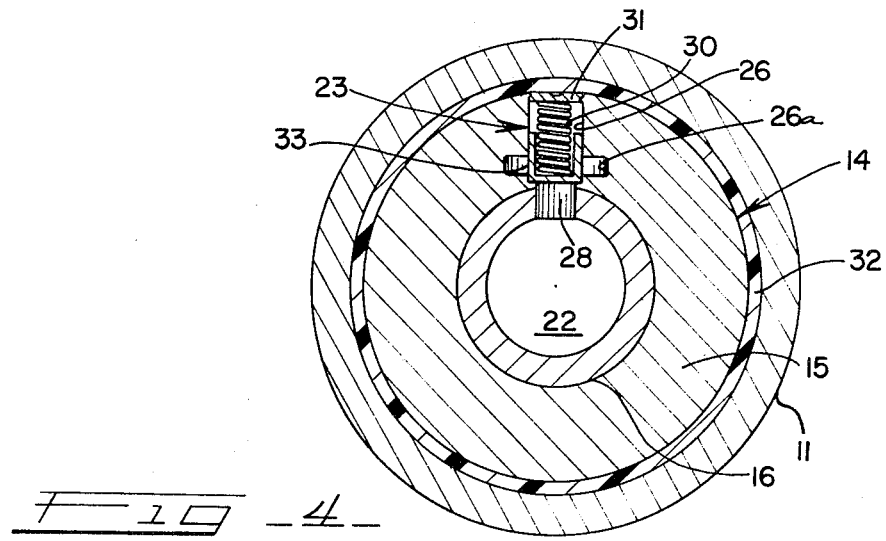
FIG. 4 is a cross section taken substantially along line 4—4 of FIG. 2.

Referring now to the drawings there is shown a double-acting hydraulic cushion 10 associated with a draft gear to which there is connected a coupler (not shown). The cushion unit 10 comprises generally a cylinder 11 having fixed to one end thereof a baseplate unit 12. Disposed intermediate the ends of the cylinder 11 is an intermediate cylinder head assembly 13 which defines with he baseplate 12 the limit of the travel of the piston assembly 14. The piston assembly 14 includes a piston head 15 and a piston rod 16 extending from one face thereof. The piston rod 16 extends through the open end of cylinder 11 and has connected to its outer end a closure member 18 of the draft gear 10. As shown in FIG. 2 the pistonhead assembly 14 is shown in its normal neutral position and upon the imposition of a buff impact the cylinder 11 moves to the left relative to the piston assembly 14. Disposed between the baseplate unit 12 and the annular retainer 17 is a return spring 25 which serves to return the cylinder 11 to its neutral position in the event a draft force is not applied to the coupler which draft force would move the cylinder in the opposite direction.

Connected between the intermediate cylinder head assembly 13 and the piston rod 16 is an accumulator chamber 19 which is in the form of a flexible boot. The flexible boot or chamber 19 serves to shut off the open end of cylinder 11 so that the latter may be charged with hydraulic fluid. Formed in the piston head assembly 14 is a fluid passage orifice 20 which combines with metering pin 20a to produce a metered flow of fluid between the first chamber 21 and the second chamber 22.

Disposed in the pistonhead 15 is a relief valve assembly 23 which is operative during buff and draft impact and upon a predetermined pressure within the first chamber 21 permits direct fluid communication between the first chamber 21, the second chamber 22 and the boot 19. The valve member 33 of the relief valve assembly 23 is cylindrical with one open end and is positioned in a first radial bore 26 and biased by a compression spring 30 which is inserted in the open end of the valve member 33 and held in place and adjusted by a threaded cap member 31 located below the piston ring 32. The radial bore 26 connects a first passage 27 and a second passage 28. A second radial bore 26a is of larger diameter and concentric with the first bore 26. The second bore 26a surrounds the valve member 33 to permit an even distribution of fluid forces about the valve member 33. Thus the high pressure acting on the valve do not cause it to bind.

OPERATION

Upon the application of an impact force and buff to a coupler (not shown), the cylinder 11 will move inwardly of the piston rod 16 from right to left of the neutral position shown in FIG. 2. The movement of the cylinder 11 to the left causes fluid to flow from the first chamber 21 through the orifice 20 into the second chamber 22, and from the second chamber to the accumulator chamber 19.

When the buff impact has been dissipated and in the absence of a draft impact the return spring 25 is operative to return the unit to its neutral position as illustrated in FIGS. 1 and 2. During this return movement the fluid pressure forces are operative to displace the hydraulic fluid from the second chamber 22 through the orifice 20 into the first chamber 21.

In the event of an overspeed impact which produces pressures within the first chamber 21 which would exceed the yield strength of the first chamber, the pressure relief valve mechanism 23 is operative to relieve undesirable pressures in the first chamber 21 and prevent damage to the unit. Because of the location of relief valve assembly 23 it is operative to permit passage of hydraulic fluid between the first chamber 21 and the second chamber 22 thereby bypassing the orifice 20. Hydraulic pressure in the second chamber in the area where the relief valve assembly 23 is located is lower and proportional to the pressure in the first chamber 21 and since the closed end or face of the valve member 33 is exposed to fluid in the second chamber 22 and moves in response thereto, upon a predetermined pressure level in the second chamber 22 which corresponds to undesirable high pressure in the first chamber 21 the relief valve assembly 23 will move outwardly in the radial bore 26 thereby permitting passage of hydraulic fluid from the first chamber 21 to the second chamber 22 by way of the first and second passages 27, 28 (see FIG. 3). This arrangement provides for the immediate and effective release of high-pressure fluid and the consequent decrease in pressure in the first chamber during an overspeed impact which would cause destruction of or damage to the unit. Also, by responding to pressure in the second chamber 22 the relief valve assembly 23 is physically smaller and more sensitive than a valve which would directly sense high-pressure fluid in the first chamber 21. The relief valve assembly 23 by being positioned radially in the pistonhead 15 is isolated from the inertial effects of longitudinal impacts thus rendering an even more sensitive valve mechanism.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A hydraulic cushioning device comprising:

a cylinder with one end closed, a piston and rod assembly movable within the cylinder and a piston rod having a hollow portion and a pistonhead about the hollow portion within the cylinder, the closed end cylinder section and pistonhead defining a first high-pressure chamber and the hollow portion of the piston rod defining a second low-pressure chamber, the relative movement between the cylinder and piston varying the size of the first chamber, said piston including a metering means in the hollow portion for metering fluid flow between said first and second chambers, said pistonhead including a passage means communicating between said first and said second chambers, said passage means including a first passage in the piston communicating with said high-pressure chamber and a second passage in the piston communicating with said low-pressure chamber and including a generally radial passage positioned between and connecting with said first and second passages, a relief valve arrangement operatively positioned in said radial passage for selectively opening and closing communication between said first and second passages of said passage means, said relief valve arrangement including a valve member having a face exposed to the low-pressure chamber and moving radially in response to the buildup of pressure therein above a predetermined level.

2. The invention according to claim 1, and biasing means urging said valve member inwardly of said cylinder.

3. The invention according to claim 2, and biasing retaining means holding said biasing means for engagement with said valve member and including adjusting means for varying the force rate of said biasing means on said valve member.

4. A hydraulic cushioning device comprising:

a cylinder with one end enclosed, a piston and rod assembly moving within the cylinder and dividing it into a first high-pressure chamber and a second low-pressure chamber, said piston including a metering means for measuring fluid flow between said first and second chambers, said piston having a passage means communicating between said first and said second chambers, said passage means including a first passage communicating with said high-pressure chamber and a second passage communicating with said low-pressure chamber and including a third passage communicating with said first and second passages, a relief valve arrangement operatively positioned in said third passage for selectively opening and closing said passage means to said first and second passages, said first passage including a passageway surrounding said relief valve arrangement being radially of the cylinder to distribute fluid pressure and thereby prevent binding of the relief valve arrangement as it moves radially of the cylinder.

* * * * *